United States Patent [19]

Mouritsen

[11] Patent Number: 5,078,417
[45] Date of Patent: Jan. 7, 1992

[54] ALL TERRAIN CYCLE FORK WITH FIBER REINFORCED RESIN BLADES AND CROWN AND METHOD OF MAKING SAME

[75] Inventor: John Mouritsen, El Dorado Hills, Calif.

[73] Assignee: Cycle Composites, Inc., Watsonville, Calif.

[21] Appl. No.: 589,662

[22] Filed: Sep. 28, 1990

Related U.S. Application Data

[63] Continuation-in-part of Ser. No. 382,127, Jun. 19, 1989, Pat. No. 5,016,895.

[51] Int. Cl.$^5$ .............................................. B62K 21/04
[52] U.S. Cl. ..................................... 280/280; 264/258
[58] Field of Search ............ 280/276, 279, 280, 281.1; 264/257, 258

[56] References Cited

U.S. PATENT DOCUMENTS

| | | | |
|---|---|---|---|
| 312,732 | 2/1885 | Knous et al. | 280/279 |
| 345,465 | 7/1886 | Waite | 280/279 |
| 366,287 | 7/1887 | Yost et al. | 280/279 |
| 589,147 | 8/1897 | Sturges | 280/280 |
| 593,814 | 11/1897 | De Rango | 280/279 |
| 609,937 | 8/1898 | Kelly | 280/280 |
| 649,633 | 5/1800 | Fauber | 280/280 |
| 660,875 | 10/1800 | Wambach | 280/279 |
| 1,998,992 | 4/1935 | Johnson et al. | 280/280 |
| 2,120,453 | 6/1938 | Anderson | 280/152.1 |
| 3,039,791 | 6/1962 | Horowitz et al. | 280/279 X |
| 3,493,240 | 2/1970 | Jenks | 280/610 |
| 3,641,230 | 2/1972 | Jenks | 264/152 |
| 3,833,242 | 9/1974 | Thompson, Jr. | 280/281.1 |
| 4,008,903 | 2/1977 | Ramond | 280/279 |
| 4,062,917 | 12/1977 | Hill et al. | 264/602 |
| 4,079,957 | 3/1978 | Blease | 280/278 |
| 4,183,776 | 1/1980 | Staub et al. | 156/156 |
| 4,493,749 | 1/1985 | Brezina | 156/182 |
| 4,627,307 | 12/1986 | Yamazawa et al. | 74/552 |
| 4,657,795 | 4/1987 | Foret | 428/36 |
| 4,662,645 | 5/1987 | McMurtrey | 280/279 |
| 4,724,115 | 2/1988 | Freeman | 264/513 |
| 4,740,346 | 4/1988 | Freeman | 264/258 |
| 4,828,285 | 5/1989 | Foret et al. | 280/279 |
| 4,828,781 | 5/1989 | Duplessis et al. | 264/250 |
| 4,830,390 | 5/1989 | Yamaki et al. | 280/280 |
| 4,850,607 | 7/1989 | Trimble | 280/281.1 |
| 4,889,355 | 12/1989 | Trimble | 280/281.1 |
| 4,902,458 | 2/1990 | Trimble | 264/46.6 |
| 4,923,203 | 5/1990 | Trimble et al. | 280/288.3 |
| 4,941,674 | 7/1990 | Trimble | 280/281.1 |
| 4,993,735 | 2/1981 | Chen | 280/279 X |

FOREIGN PATENT DOCUMENTS 0275797  7/1988  European Pat. Off. ............ 280/279

OTHER PUBLICATIONS

Jun. 1989 article entitled "Future Forks" by Doug Roosa *Bicycle Guide* magazine, pp. 89-94.
Aug. 1987 article entitled "Look Kevlar 2000" by Doug Roosa *Bicycle Guide* magazine, pp. 36-39.

Primary Examiner—Andres Kashnikow
Assistant Examiner—Brian L. Johnson
Attorney, Agent, or Firm—Pollock, Vande Sande & Priddy

[57] ABSTRACT

A fork assembly comprising a stiff steerer tube made of metal or the like, a generally hollow unitary crown and blade component made of molded resin-impregnated fibrous material, and a connecting assembly for interconnecting the steerer tube to the unitary crown and blade component at a first position above and a second position below a bicycle head tube. The blades of the unitary component have a lower portion for wheel attachment, an upper portion for attachment at the first steerer tube position, and an intermediate crown portion integrally uniting the upper and lower blade portions and a crowned boss for attachment at the second steerer tube position. The steerer assembly may include a laterally extending anchor member which is captured in the crown boss as it is molded from the resin-impregnated fibrous material. The anchor member may have downwardly projecting legs laminated between overlapped wall sections of the crown portions of the blades.

20 Claims, 8 Drawing Sheets

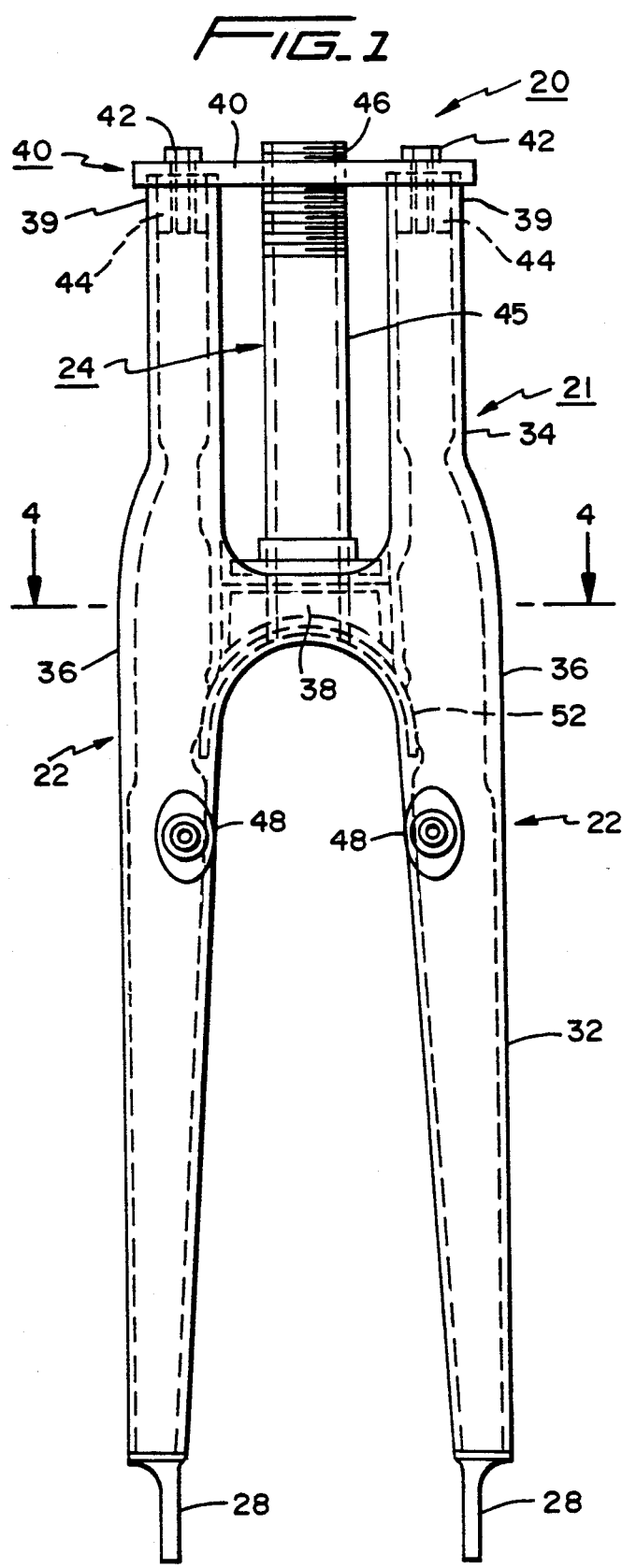
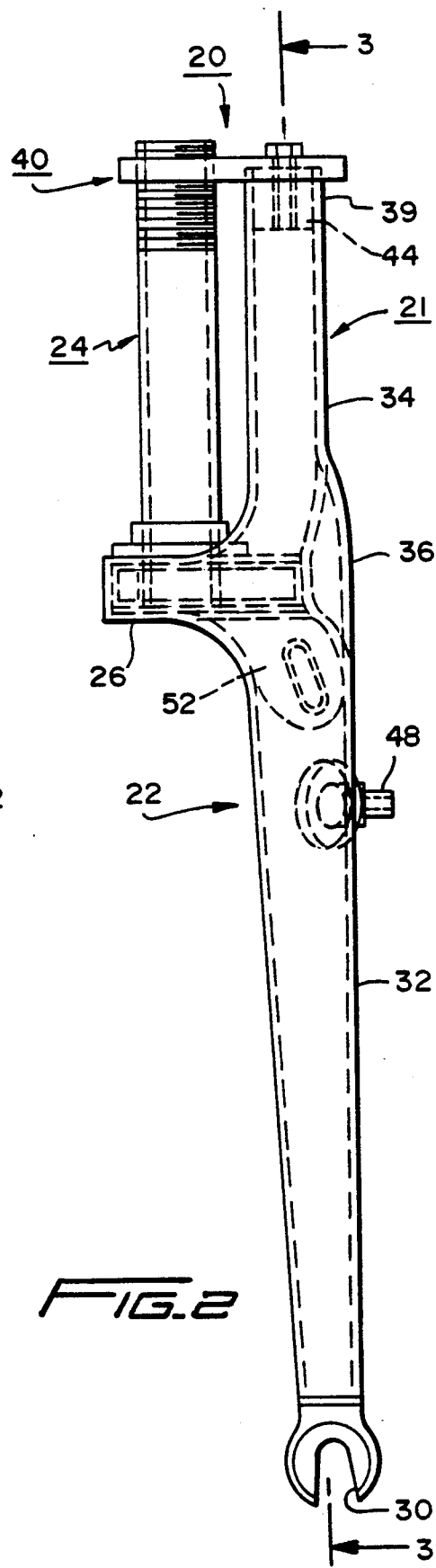

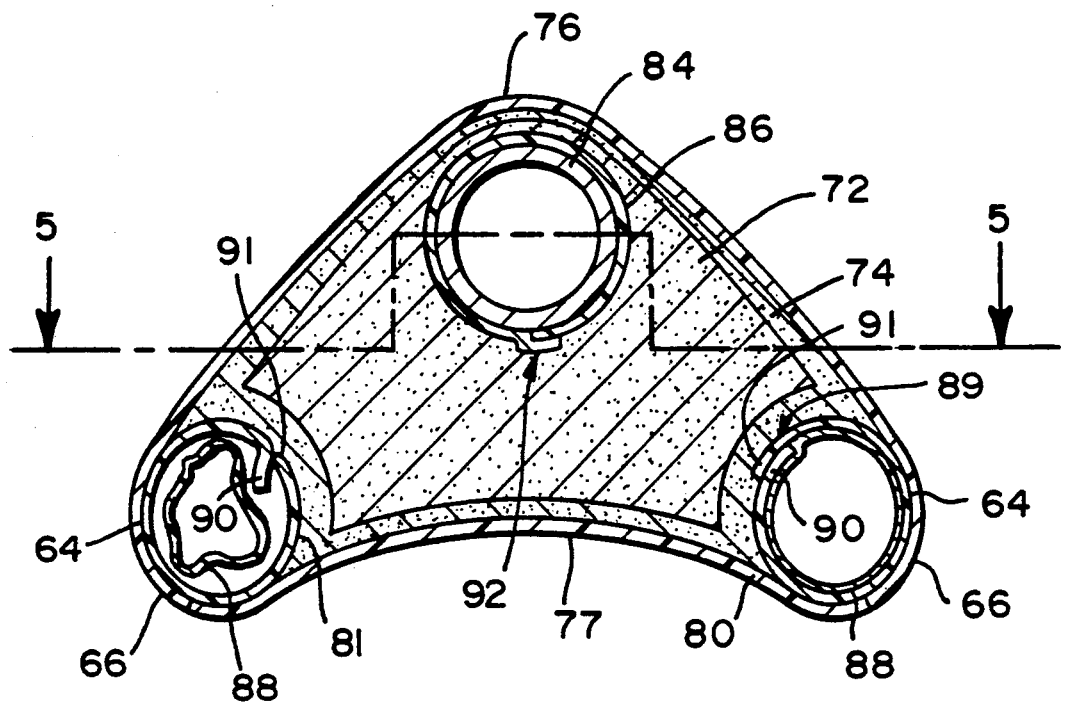
FIG_4
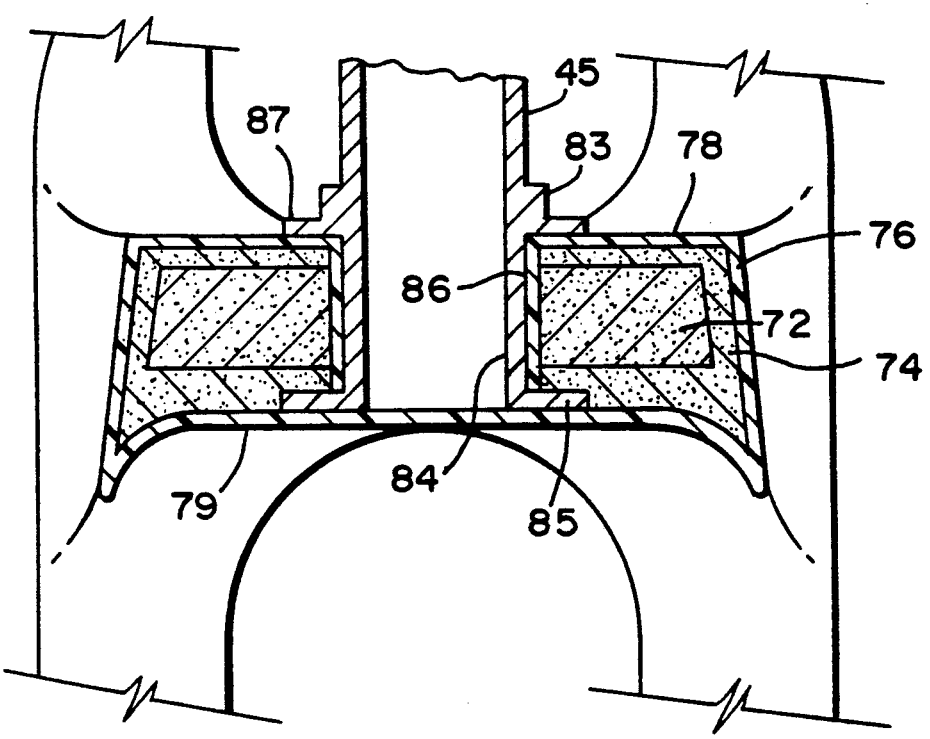
FIG_5

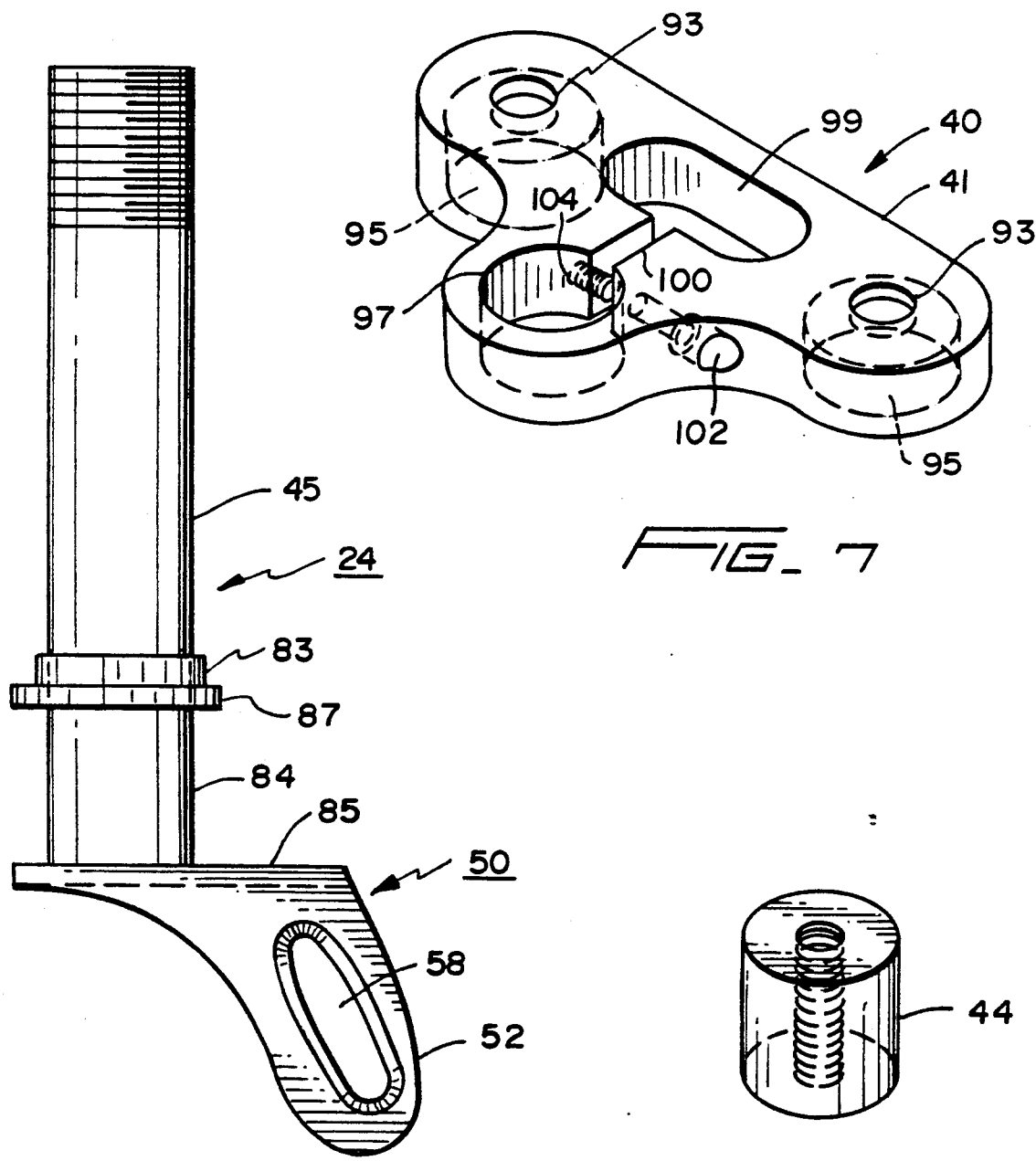

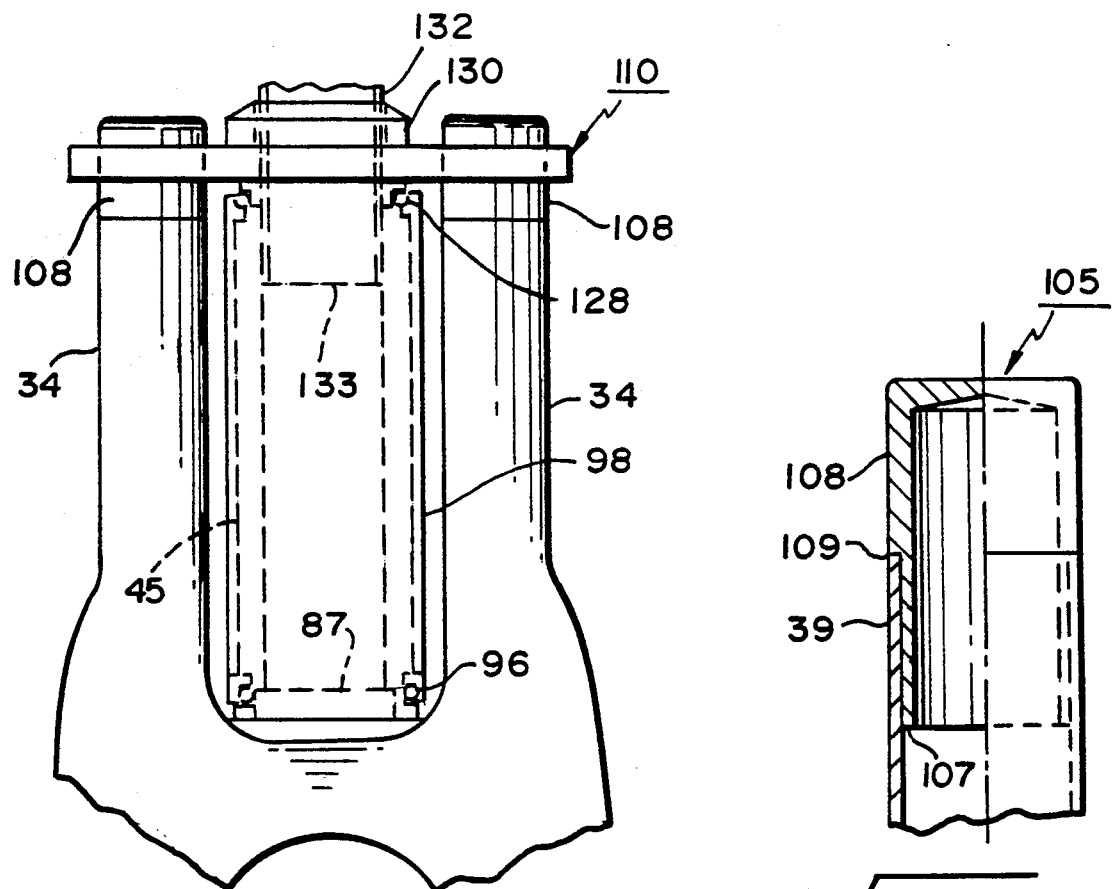
FIG_9
FIG_10
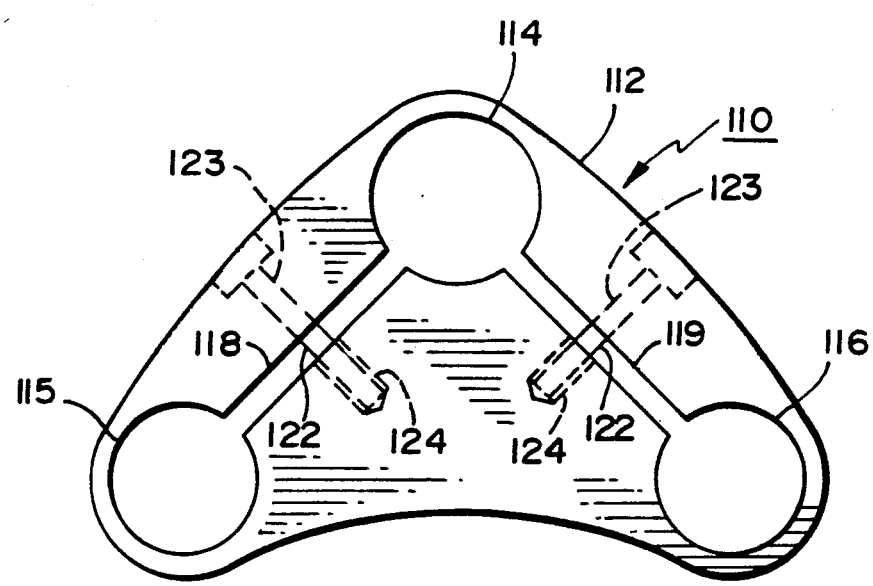
FIG_11

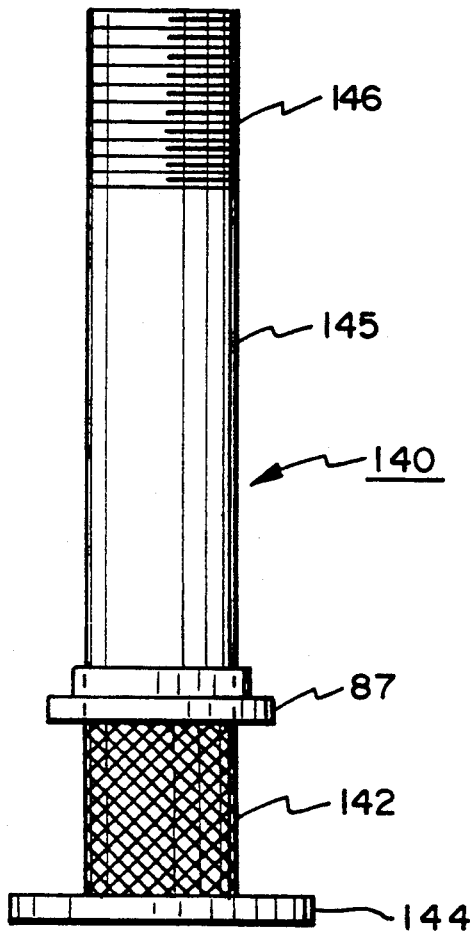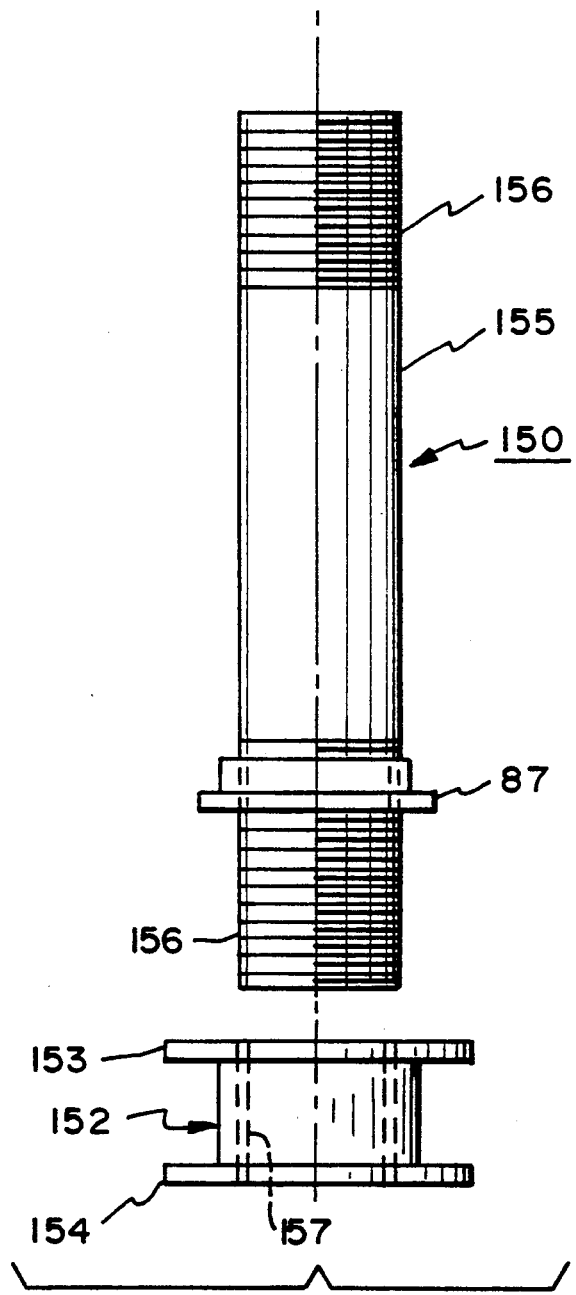
FIG_12
FIG_13

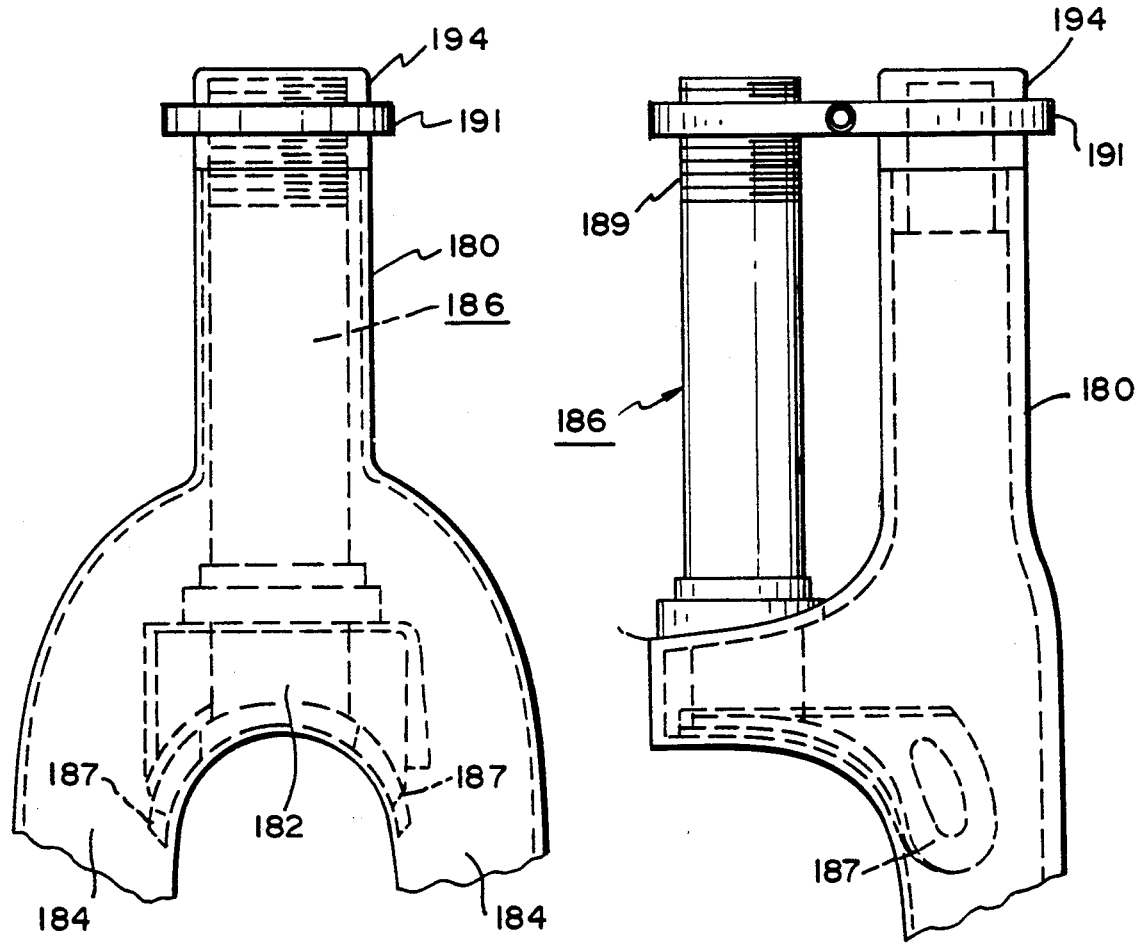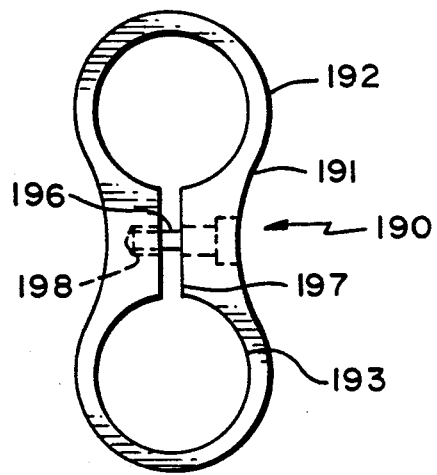

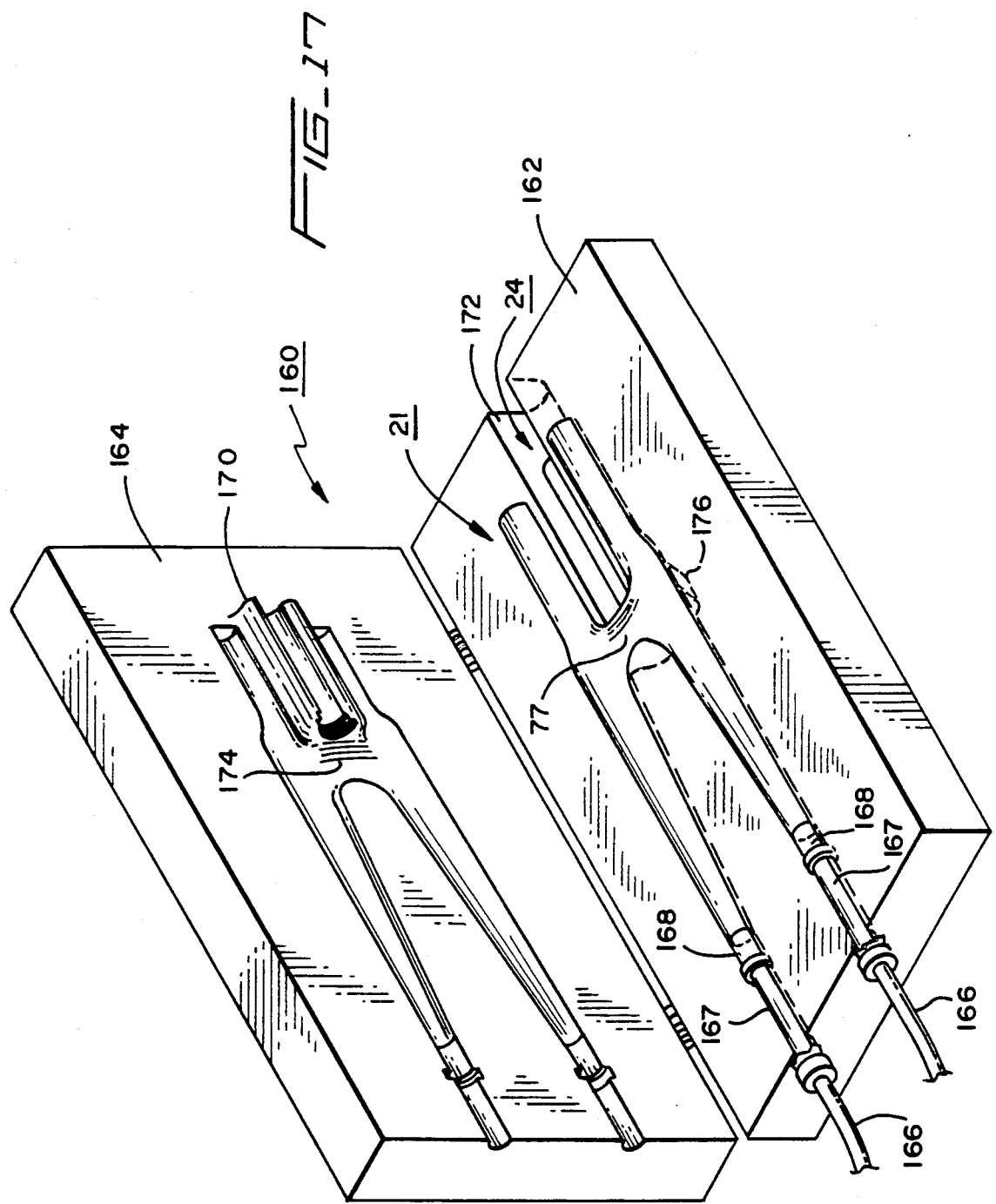

ALL TERRAIN CYCLE FORK WITH FIBER REINFORCED RESIN BLADES AND CROWN AND METHOD OF MAKING SAME

RELATED APPLICATIONS

This is a continuation-in-part of patent application Ser. No. 07/382,127, filed June 19, 1989, U.S. Pat. No. 5,046,845, in the names of Ritch Hollingsworth and John Mouritsen, the entire contents of said patent being expressly incorporated herein by reference.

TECHNICAL FIELD

The present invention relates to forks for mounting wheel assemblies on cycles and to methods for making such forks. More particularly, the present invention relates to forks for all-terrain cycles, such as the front fork of a mountain bicycle, wherein the fork comprises a unitary crown and blade component made from fibrous material impregnated with a synthetic resin. Means is provided for connecting the unitary crown and blade component to both a top portion and a bottom portion of a rigid steerer assembly made from metal or equivalent plastic.

BACKGROUND OF THE INVENTION

The style of bicycle commonly known as a mountain bicycle is designed and intended for use off-road on trails and rough ground. Since this type of bicycle is routinely ridden vigorously over rough terrain, rocks and other obstacles, the frame structures and related components are subject to higher loadings and greater physical abuse than their road-going counterparts. In order to endure this abuse, all of the structures and components of the bicycle must be designed and manufactured to be very sturdy. The front fork of the mountain bicycle, in particular, is subjected to high loadings as the front wheel impacts against obstacles or lands after jumps. The structural integrity of the front fork is critical in that a failure of this component almost ensures a serious fall for the rider.

In light of these considerations, conventional mountain bicycle forks are typically built of metal with thicker sections than comparable road-going bicycle forks and, as a result of this, they are substantially heavier. A light weight bicycle is desirable because any excess weight requires additional energy to accelerate or climb hills and it slows the response of the bicycle to rider control inputs. Thus, in the case of conventional mountain bike forks, the additional weight of structure for necessary strength is detrimental to the overall performance of the bicycle.

Conventional mountain bicycle forks typically have an inverted Y-shape configuration with the depending legs (known as fork blades) extending from the attachments at either side of the front wheel axle up to a crown structure which forms the connections between the fork blades and the steerer tube. The steerer tube then extends upward through the head tube of the bicycle frame where it pivots in the head set bearings. Handle bars are then connected to the steerer tube through a stem assembly. This configuration takes the loads imposed through the front wheel up through the fork blades and concentrates them in the steerer tube and in the joint where it intersects the crown. The front wheel and fork blades are thus cantilevered off of the steerer tube by a single crown connecting structure.

To sustain the bending stresses imposed by this cantilevered load, the steerer tube must be extremely strong. Conventional head set bearings constrain the diameter of the steerer tube to 1 inch or 1.25 inches. As a result of this, the conventional steel steerer tube must be thick walled and consequently heavy. Examination of the weights of the individual components which make up the fork assembly shows that the steerer tube is the heaviest single component. Substitution of less dense materials, such as aluminum, titanium or fibrous plastic composites, for the steel of the steerer tube does little to decrease the weight because the lower density materials also have lower moduli of elasticity. Thus, for the same outside diameter they must be thicker walled to have the same stiffness. This negates the advantage of their lower density.

Another important design consideration in making the steerer tube is the economy of having it interface with conventional handle bar stems which require a standard internal tube diameter. Thus, this consideration may prohibit the use of steerer tubes with a thicker wall, at least at its interface with the handle bar stem, in a front fork designed for industry-wide use.

The single crown connection of conventional mountain bicycle forks is also a critical link between the front wheel and the bicycle frame because it must take the relatively high bending loads from the blades and transfer them to the steerer tube through relatively small cross-sectional areas. These high loads are further concentrated at the relatively small areas of the joints between the different fork components and such concentrations result in very high stress loadings across these joints. Stress concentrations at such interface areas may be further aggravated because of differences in materials, such as where a part made of another metal meets the steel of a steerer tube or a welding or braising flux is provided between two parts of different alloy compositions. Welding or braising also adds undesirable weight to the fork. Different metals also have different thermal expansion coefficients which may further aggravate stress concentrations.

Attempts were made in the early development of bicycles to reduce the stresses in the steerer tube. One such attempt is disclosed in U.S. Pat. No. 593,814 granted to Louis De Rango on Nov. 16, 1987. Mr. De Rango proposed an H-shaped structure which extended the fork blades up past the lower crown to about the race of the top head set bearings, where the blades formed an attachment at the top of the bicycle head tube. This configuration significantly reduced the cantilevered loading condition as compared to the steerer tube connections of conventional Y-shaped forks. In De Rango, some of the bending stresses are carried in the upper portion of the fork blades and as a result, the bending stresses in the steerer tube are reduced significantly. The steerer tube can then have a much thinner wall and thus be a lighter structure. In fact, De Rango eliminated the steerer tube entirely in favor of small opposing stubs for carrying the head set bearings. Motorcycles commonly use a configuration much like the De Rango design except that a one piece steerer tube is employed instead of small opposing stubs. These configurations provide strength and stiffness far greater than that if the fork tubes are terminated at the lower crown, such as on conventional bicycles.

Such H-shaped structures of the prior art, with or without a full steerer tube, involved some of the same disadvantages as the inverted Y-shaped forks. For example, excessive concentrations of stress may still result in such prior art H-shaped structures because they still involve the use of crown members of small cross-section for connecting the blades at the top and bottom of the steerer tube or equivalent steerer structure. Furthermore, the H-shaped forks still required assembling numerous individual parts, often of different materials, and where these parts were welded or braised together, significant stress concentrations still occurred, sometimes leading to structural failure. The welding and braising also results in undesirable increases in weight. In some instances, the cross bar of the "H" may be clamped, instead of welded, to an intermediate portion of the extended blades. In these instances, the relatively small area of the blades engaged by the clamping device may result in undesirable high levels of stress concentration. Such clamping devices also may slip and cause misalignment of the blades under the high bending loads and different force vectors to which a front fork is subjected as the bicycle is ridden over rough terrain. Furthermore, such clamping devices often involved more weight than a welded or braised connection.

DISCLOSURE OF THE INVENTION

The present invention overcomes the deficiencies of the prior art by providing an improved cycle fork having a unitary crown and blade component, which has an H-shape and is constructed of advanced composite fiber, and resin materials. The fork blades of the invention extend from the level of wheel attachment to the level of the top of the head tube, and the assembly features a light weight steerer tube which is mechanically captured by molding an anchor member at its base into the crown and blade component.

The fork assembly of the invention may be made by a relatively easy and economical method which is readily adaptable to mass-production techniques. The materials of the respective components of this composite fork assembly may be chosen so as to provide great strength and stiffness combined with light weight. The assembly takes full advantage of the high ratio of stiffness and strength to weight provided by advanced fiber and resin systems. These materials are used to carry the major bending loads applied to fork assemblies, thereby allowing the use of an ultra light steerer tube.

The invention therefore is capable of providing an unusually light (ultra-light) front fork for off-road cycles. This is achieved by generally hollow tube-like blades which extend from wheel attachments to the top of the head tube, a generally hollow crown structure provided with a light weight steerer tube having a base which is captively molded integrally into the crown. The overall structure of this composite front fork provides unexpected strength, and performance characteristics which are superior to both conventional and extended tube metallic forks, as well as to the resin and fiber composite forks of the prior art.

The basic steerer tube preferably has an anchor member which is captured in the crown portion during molding and may include depending legs which attach to the bottom wall of the crown and inner walls of the blades below the crown. The anchor member also may include an upper annular flange which engages a top wall of the crown. Other variations include an internally threaded anchor member which is molded into the crown separately and into which a steerer tube, threaded at each end, can be inserted after the fork has been removed from the mold in which it is formed.

It is therefore a principal object of the invention to provide rough terrain cycle forks wherein the fork tubes extend from the wheel to the top of the head tube such that the bending loads carried in the fork blades react to the top and bottom of the steerer tube as shear and compression loads. This avoids concentrations of the blade bending loads at the crown and the crown to steerer tube connection and in the steerer tube itself. This in turn allows the steerer tube to be drastically reduced in cross-section and weight and the substitution of materials lighter than the normal steel, such as aluminum, titanium, or fiber and resin composites.

Another object of the invention is to mechanically capture a light weight steerer tube in the crown structure to prevent any possibility of separation and to further reduce the concentration of stress at the crown to steerer tube connection.

A further object of the invention is to form the blades and crown as generally hollow structures in a single molding operation so that the blade and crown portions are joined in a single seamless structure having a substantially continuous wall of resin-impregnated fibrous material.

Yet another object of the invention is to provide a composite fork construction that allows the tailoring of its flexure characteristics so that the fork is unusually stiff in the lateral direction and in torsion while being soft enough in the fore and aft direction to provide a comfortable but easily controllable ride. In this regard, the composite construction imparts shock damping to the fork assembly which is not achievable with conventional metallic forks.

A still further object of the invention is to provide a fork configuration that allows a single model to accommodate any steerer tubes from 1 inch to 1.25 inches in diameter and of any length required for normal bicycle head tube lengths. Thus, the fork disclosed can accommodate a variety of steerer tube designs.

Another object of the invention is to provide a unitary crown and blade component wherein both the blade portions and the crown portion may have aerodynamic and/or aesthetically pleasing cross-sectional shapes.

The foregoing objectives are achieved by a unique fork structure that takes advantage of both the properties of steerer tubes made of aluminum or equivalent plastic and the properties of fork blades made from advanced composite materials comprising textile or other fibrous materials impregnated with a synthetic resin. This unique fork structure provides a crown structure which transfers bending loads from hollow fork blades to a hollow steerer tube at two vertically spaced locations one on either side of the head tube of a bicycle. The unique crown and blade structure thus provides a gradual transition from fork blades of composite materials to the metal steerer tube, and thereby transfers bending loads from the hollow fork blades to the hollow steerer tube in a more efficient manner and without significant stress concentrations. This allows for a lighter and more efficient fork assembly structure because the loads which are passed through the fork to steerer tube connections and through the steerer tube to the head tube are not nearly as high as the concentrated loads found in the crowns of the prior art fork structures. The durability and integrity of this structure may be further increased by laminating between layers of the resin impregnated fibrous material of the crown portion a part or all of an anchor member at the base of the steerer tube. The integrity of this laminate may be further increased by bonding the composite fork blades to the composite crown portion through apertures in depending legs of the anchor member of the steerer assembly

BRIEF DESCRIPTION OF THE DRAWINGS

A better understanding of the invention and its advantages will be apparent from the detailed description below of specific embodiments taken in conjunction with the accompanying drawings in which:

FIG. 1 is a front elevational view of a bicycle fork made in accordance with the present invention;

FIG. 2 is a side elevational view of a bicycle fork made in accordance with the present invention;

FIG. 4 is a plan view in section taken along lines 4-4 of FIG. 1;

FIG. 5 is a fragmentary elevational view in section taken along line 5-5 of FIG. 4;

FIG. 6 is a side elevational view of a steerer tube and anchor assembly in accordance with the invention;

FIG. 7 is a perspective view of a triple clamp in accordance with the invention;

FIG. 8 is a perspective view of a blade top insert;

FIG. 9 is a fragmentary front elevational view of a modification of the invention and illustrates the relationship between the front fork of the invention and a bicycle head tube;

FIG. 10 is a fragmentary elevational view in partial section of the upper capped blade portion of the modification of FIG. 9;

FIG. 11 is a plan view of the triple clamp member of the modification of FIG. 9;

FIG. 12 is an elevational view of a modification of the steerer tube and anchor assembly of the invention;

FIG. 13 is another modification of the steerer tube and anchor assembly of the invention;

FIG. 14 is a fragmentary front elevational view of a modification of the unitary crown and blade component of the invention;

FIG. 15 is a fragmentary side elevational view of the modification of FIG. 14;

FIG. 16 is a plan view of the modified top clamp for the unitary component of FIG. 14; and, FIG. 17 is a perspective view of a molded front fork assembly made in accordance with the invention and lying in an opened mold assembly.

DETAILED DESCRIPTION OF EMBODIMENTS SHOWN IN THE DRAWINGS

Figure 3:
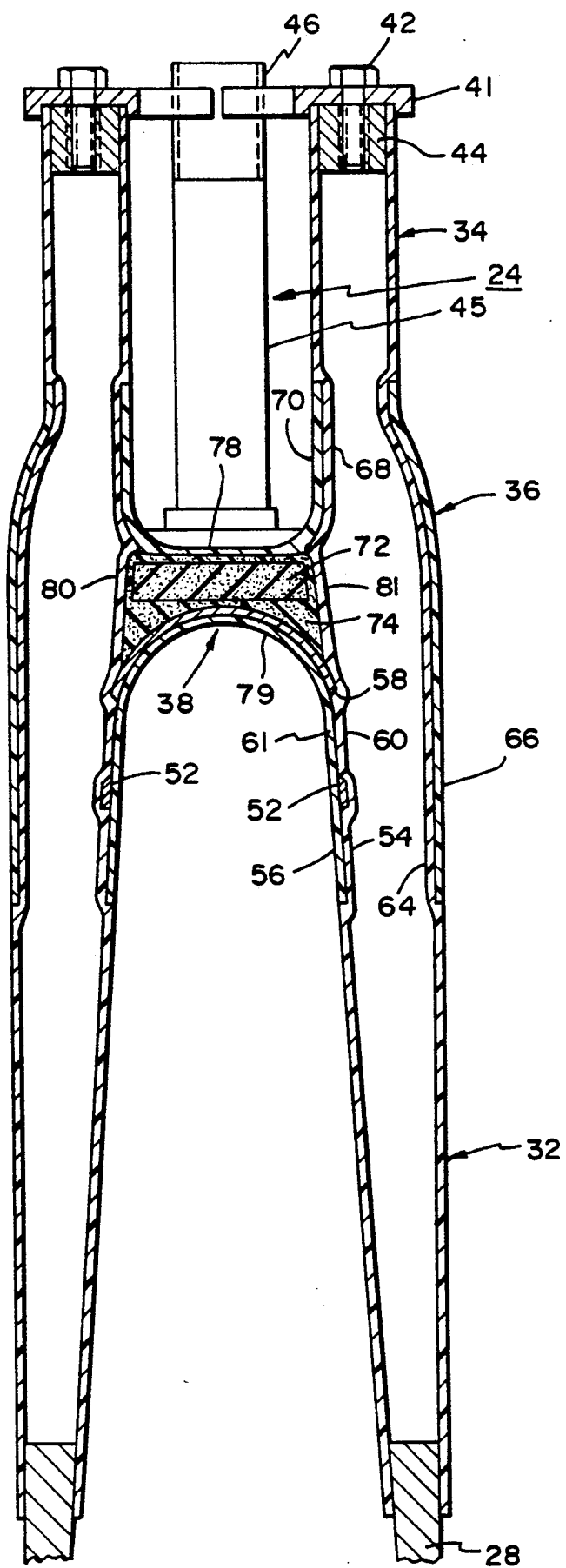
FIG. 3 is a front elevational view in section taken along line 3-3 of FIG. 2.

Referring to FIGS. 1 and 2, there is shown a rough terrain cycle fork 20 made in accordance with the present invention. This fork comprises a unitary crown and blade component 21 having a pair of hollow blades 22,22 connected to a steerer assembly 24 by a rearwardly projecting crown boss 26. At the lower end of each blade is an insert forming a pair of fork ends 28,28 which are secured in a socket in each lower blade end, either by being molded in place or by later application of an adhesive bonding composition. Each of the fork ends has a slot or aperture 30 for receiving a corresponding end of the front wheel axle in the same manner as the ends of a conventional fork. Each of the fork blades has a lower portion 32, and upper portion 34, and an intermediate crown portion 36 connecting the upper and lower portions. The crown portions 36,36 are interconnected to each other and the crown boss 26 by means of a crown arch portion 38. Upper portions 34, 34 are preferably of uniform diameter and extend upward in parallel so that these may be molded with the maximum length needed for the longest head tube length, and then cut to shorter lengths for other head tube lengths. Accordingly, a single molded configuration of the fork assembly will accommodate a variety of frame sizes.

The distal ends 39,39 of upper blade portions 34,34 are connected to a steer tube 45 of steerer assembly 24 near its upper end by a triple clamp member 40 which is secured to the upper blade ends by a pair of bolts 42,42 which are threaded into corresponding blade inserts 44,44. Blade inserts 44,44 are adhesively bonded into the otherwise substantially hollow blade ends 39,39. The upper end of steerer tube 45 is threaded at 46 for connection to the head tube nut of a mountain bicycle frame in the same manner as a conventional fork. A pair of metal brake bosses 48,48 are adhesively bonded to inner forward surfaces of blades 22,22 each for receiving a bolt (not shown) on which is mounted a front brake assembly (not shown) in conventional fashion.

The steerer assembly 24, the lower fork ends 28,28, the upper blade inserts 44,44, the bolts 42,42, and the triple clamp 40 and its bolt (not shown) are made of a stiff (rigid) material, such as metal or an equivalent plastic composition; while the blades 22, the crown boss 26 and the crown arch 38 are made of a fibrous material impregnated with a synthetic resin. Preferably, the stiff material of the steerer assembly and its associated components is steel or aluminum. More preferably, the steerer tube is 7075 T-6 aluminum, with acceptable alternatives being 6A1-4V titanium, 2024-T-6 aluminum and 4130 chromium-molybdemum steel. The triple clamp, top blade inserts and bolts are more preferably 6061-T-6 aluminum, with acceptable alternatives for the triple clamp and blade inserts being a carbon fiber and epoxy composite and a chopped carbon fiber and thermoplastic resin composite.

On the other hand, the substantially continuous wall defining the substantially hollow unitary blade and crown component is made of a fibrous material impregnated with a synthetic resin, most preferably unidirectional carbon fibers in an epoxy resin matrix, such as Amoco T-300 fibers in an SG-11 resin matrix as available from Amoco Performance Products of Greenville, N.C. Acceptable but less preferable alternatives are Amoco T650-42 fibers in an SG-11 resin matrix or E-fiberglass fibers in an epoxy resin matrix such as SG-11. A preferred alternative for lowering material costs is a mixture of about 80% unidirectional E-fiberglass fibers and about 20% (by weight) unidirectional carbon fibers in an epoxy resin matrix. Small quantities (1-5% by weight) of "SPECTRA" and "KEVLAR" fibers may be substituted for the E-fiberglass fibers to adjust strength and compliance characteristics of the final product as may be desired. "KEVLAR" is a trademark of the DuPont Company for its proprietary aromatic polyamide unidirectional fibers, and "SPECTRA" is a trademark for polyethylene unidirectional fibers which are available from the Allied Fibers Division of Allied Signal, Petersburg, Va. Such resin-impregnated fibrous materials are referred to in this specification as "composite materials".

One very important difference between prior art forks and the embodiment of FIGS. 1-12 is that the steerer assembly 24 includes an anchor means comprising an anchor member, generally designated 50 (FIG. 6), having a pair of forwardly and downwardly projecting legs 52,52 as best shown in FIGS. 2, 3 and 6. Depending legs 52,52 are secured to parts of both inner blade wall 54 and inner crown wall 56 as seen best in FIG. 3. In other words, legs 52,52 of anchor member 50 are laminated between a corresponding part of inner blade wall 54 and a corresponding part of inner crown wall 56 and the walls 54 and 56 are laminated together to form a substantially continuous wall which encloses and engages the legs 52,52 to mechanically lock together the steerer assembly 24 and the unitary crown and blade component 22. To further secure both the inner crown wall and the inner blade walls to anchor legs 52,52, an aperture 58 may be provided in each of the legs so that an area 60 of inner blade wall 54 may be bonded to a corresponding area 61 of inner crown wall 56.

Referring now to FIG. 3, inner blade wall 54 and inner crown wall 56 form part of intermediate crown portion 36 of the unitary crown and blade component. Crown portion 36 also comprises an outer blade wall 64 abutting an outer crown wall 66 and upper abutting segments 68 and 70 of inner blade wall 54 and inner crown wall 56, respectively. The respective blade and crown walls are formed from composite materials of fiber and synthetic resin, preferably from strips and patches of "prepreg" material which are cut from larger sheets and molded together to form a unitary crown and blade component in accordance with the teachings of U.S. Pat. No. 8,916,845 referred to hereinabove and incorporated by reference.

As taught in said earlier U.S. Patent, the unitary crown and blade component preferably has a unitary wall of substantially continuous fibrous material impregnated with a synthetic resin and this unitary wall is molded from this composite material to produce a generally hollow structure which does not require for its structural integrity any internal structural elements extending transversely across the interior chamber surrounded by the unitary wall. The unitary wall includes at least one integrally uniting juncture wherein corresponding parts of at least two adjacent wall sections, each preferably comprising at least one piece of prepreg material, have been overlapped and then bonded together, preferably by molding under pressure, to provide the unitary wall which extends around the hollow interior chamber of the unitary crown and blade component. The at least one molded juncture may extend longitudinally along the length of each blade or portion thereof to integrally unite overlapped edge parts of two opposing wall sections to form a generally hollow segment of the unitary component. Alternatively, the at least one molded juncture may be a circumferential juncture integrally uniting different segments of the crown and blade portions. Thus, although the blade walls are preferably made from top to bottom from continuous strips of prepreg, upper and lower blade segments may be integrally united by a circumferential juncture to an intermediate crown segment to form the continuous blade walls 54 and 64 shown in FIG. 3.

Although boundary lines between abutting layers and overlapped parts of prepreg material are shown in the drawings for purposes of illustration, these boundary lines are substantially obliterated during the molding operation which causes fibers in the respective uncured and overlapped parts to intermix and form a single substantially continuous wall when these parts are pressed together and cured under pressure. The overlapped parts are thus integrally united together in a manner which provides sufficiently intimate contact between the fibrous material of one of the overlapped parts with the fibrous material of the other overlapped part for stress loadings to be transferred from fiber to fiber across what is referred to in this specification as a pressure molded juncture.

Although adhesive bonding could be used between areas 60 and 61 and other abutting areas of the crown and blade walls, and between overlapped parts of these walls, abutting areas and overlapped parts are preferably integrally united. In this specification, "integrally united" means that an edge part or other area of a first section or piece of resin impregnated fibrous material was placed in overlapping contact with an edge part or other area of a second section or piece of resin impregnated fibrous material, and that at least one of the first and second sections or pieces was cured by a substantial amount after being so overlapped. Preferably, both the first and second sections or pieces are cured by a substantial amount after being so overlapped.

"Meldedly bonded" means that an uncured section or piece is integrally united to another uncured section or piece during a molding process. "Moldedly bonded" means an uncured section or piece is integrally united during a molding process to a section or piece which is either uncured or has been pre-cured by a substantial amount before the molding process. A "molded" juncture therefore may be either meldedly or moldedly bonded. "Adhesively bonded" means a cured section or piece is joined to another cured section or piece, respectively, by a layer of an adhesive composition, which was applied in an uncured state and then cured to perfect a joint between the two previously cured sections or pieces.

As best seen in FIGS. 3, 4 and 5, crown boss 26 and the crown arch 38 further comprise a pre-made foam core 72 having the cross-sectional shape in plan view shown in FIG. 4. This foam core is preferably made from a polyvinyl chloride foam available under the name "KLEGECELL" from the Klegecell Company of Grapevine, Tex. Satisfactory but less preferred alternative materials for foam core 72 are a polyvinyl chloride foam available under the name "DIVINYCELL", an end grain balsawood available under the name "BALTEK", and a polyamide foam available under the name "ROACELL".

Core 72 is preferably surrounded by an outer foam layer 74 of synthetic resin which is formed from a coating applied around core 72 in the form of a paste or viscus liquid prior to the molding operation for forming the unitary crown and blade component. Layer 74 preferably comprises a foamable epoxy syntactic resin that is heat activatable and is available as "MICROPLY EM-1" from Y. L. A., Inc., of Concord, Calif. Layer 74 also may be made from an expandable film adhesive such as that available from Ciba-Geigy of Fountain Valley, Calif., under the name "R-370B". The heat of the molding operation causes these resin materials to expand by foaming and thereby to apply the internal pressure needed to shape the walls of arch portion 38 which enclose foam core 72 and its foamable coating. The walls of resin-impregnated fibrous material shaped in this fashion include a front crown wall 76, a rear crown wall 77, an upper crown wall 78 and a lower crown wall 79, as well as abutting parts 80 and 81 of inner blade wall 54.

The steerer assembly 24 includes a lower tubular part 84 connected by a horizontal flange 85 to forwardly projecting and downwardly depending legs 52,52 as shown in FIG. 6, and this lower tubular part passes through foam core 72 and is surrounded by an interior wall 86 of prepreg material as shown in FIG. 4. Although not shown, a part of expandable layer 74 may also be placed between interior wall 86 and pre-foamed core 72. As also illustrated in FIG. 4, pressure against inner blade wall segments 80 and 81 for opposing expansion of foam layer 74 is preferably provided by a pair of expandable bladders 88,88 which may be pressurized internally by pressurized air. Bladders 88,88 also press against other interior surfaces of the blades for molding the walls of the blade and crown portions against a mold surrounding the outer surfaces of the blade and crown component. Thus, as illustrated in the interior of the left blade of FIG. 4, the bladders 88,88 are laid up in their deflated condition such that the overlapped edge parts 90 and 91 of the prepreg for forming the left blade are in a loose and uncompressed condition, and as illustrated in the interior of the right blade, when the bladders are in their pressurized condition, the edge parts 90 and 91 are pressed together to form a pressure molded juncture 89 during the molding operation. The pressure created by the foaming expansion of layer 74 forms a similar pressure molded juncture 92 in interior wall 86 adjacent to lower part 84 of the steerer tube. During the time that pressure is exerted by the bladders 88,88 and the expanding foam layer 74, the uncured composite material of the fork, which is laid up as an uncured shell within the mold, is heated and cured within the mold to form the unitary crown and blade component shown in the drawings.

Referring now to FIGS. 6, 7 and 8, steerer tube assembly 24 includes an annular member 83 between upper and lower steerer tube parts 45 and 84, respectively. Annular member 83 includes a radially projecting flange 87, the upper surface of which forms a bearing seat for the lower head set bearing 96 which is mounted in the head tube 98 as illustrated diagrammatically in FIG. 9. The lower surface of flange 87 is adhesively bonded to the upper wall 78 of crown boss 26 as illustrated in FIG. 5.

As shown in FIGS. 3, 7 and 8, the body 41 of triple clamp 40 is secured to the pair of inserts 44,44 by the pair of bolts 42,42 which pass through apertures 93,93 in triple clamp body 41. Triple clamp 40 further comprises counterbores 95,95 for receiving upper distal ends 39,39 of blade portions 34,34 and an aperture 97 through which passes the threaded upper portion 46 of steerer tube part 45. Triple clamp 40 is preferably positively clamped to threaded portion 46 of the steerer tube by means of an elongated aperture 99 connected to aperture 97 by a slot 100, which provides a clamping structure for changing the diameter of aperture 97 when a bolt (not shown) is inserted in a bolt channel 102 and tightened by engagement with threads 104.

Referring now to FIGS. 9, 10 and 11, there is shown a modification of the triple clamp arrangement and related structure for securing the upper portions of the blades to the upper end portion of the steerer tube. In this modification, the top end plugs 44,44 are replaced by a hollow cap 105 having a lower trunk portion 107 which fits within the upper distal end 39 of each blade. At the transition between trunk 107 and a larger outside diameter head 108 is a shoulder 109 which mates with the top edge of the blade. Caps 105,105 are integrally secured to the blades by adhesive bonding between trunk 107 and the upper distal end segment 39 of upper blade portion 34. Fork cap 105 is preferably made from a bar of 6061-T6 aluminum.

As shown in FIG. 9, the heads 108,108 of the caps are engaged by a modified triple clamp 110 which differs significantly from triple clamp 40 previously described. Triple clamp 110 has a body 112 containing three apertures 114, 115 and 116 which are inter-connected by a pair of slots 118 and 119. A pair of bolts 122,122 are received in corresponding bolt holes 123,123 and engage threads 124,124 such that tightening of the bolts decreases the diameters of the apertures and causes aperture 114 to clamp on the threaded end 46 of the steerer tube, and apertures 115 and 116 to clamp on the head 108 of a corresponding cap 105 as shown in FIG. 9. Optionally, aperture 114 may be made sufficiently large that it does not actually clamp down on threaded portion 46 to avoid the possibility of damaging the threads of the steerer tube.

In assembling the modification of FIGS. 9-11, upper portion 45 of the steerer tube is inserted up through lower head set bearing 96, bicycle head tube 98, upper head set bearing 128, and aperture 114 of triple clamp body 112. The steerer assembly is then retained in this position by a head nut 130 which engages the threads of threaded portion 46 of the steerer tube. The tightening of head nut 130 pulls radial flange 87 of the steerer assembly up against lower headset bearing 96 and pulls triple clamp body 112 down against upper headset bearing 128, thereby firmly securing the steerer assembly within the head tube 98 and the entire fork assembly to the bicycle. The bolts 122,122 are then tightened in their bolt holes 123,123 to securely clamp each of the apertures 115 and 116 onto its corresponding cap head 108, which in turn securely fastens triple clamp 110 to each blade of the unitary crown and blade component. The advantage of this triple clamp arrangement relative to the triple clamp arrangement of FIGS. 3 and 7 is that the former allows relatively easy vertical adjustment of the capped ends of the blades relative to triple clamp 110 to accommodate manufacturing variations in the height of the upper blade ends 39,39 above the bearing flange 87 of the steerer assembly.

The lower and upper headset bearings 96 and 128, respectively, provide for rotation of the entire fork assembly relative to the bicycle frame. After the fork assembly is thus rotatably secured to the bicycle frame, the fork assembly receives a handle bar stem 132 having a lower end 133 which is inserted from above down into upper steerer tube part 45. The stem is then secured in place by an expansion means which is not shown in the diagrammatic illustration in FIG. 9 of the steerer assembly to head tube connection.

In FIGS. 12 and 13, there are shown two different modifications of the anchor means at the base of the steerer assembly. Steerer assembly 140 has a knurled or otherwise roughened steerer tube portion 142 to which is attached an annular flange 144, which may be of uniform diameter and need not utilize a depending extension, such as depending legs 52 of steerer assembly 24. In other words, the knurled portion 142 and uniform flange 144 will provide sufficient capture and adherence between the steerer assembly and the uniform crown and blade component for many applications of the invention. Upper steerer tube part 145 and upper threaded end 146 correspond to parts 45 and 46 of steerer assembly 24.

Similarly, sufficient capture and adherence for many applications will be provided by the separate spool-like base 152 of the steerer assembly 150 shown in FIG. 13. In this embodiment, the spool-like base 152 has a pair of opposing upper and lower flanges 153 and 154 and is threaded for engagement with a threaded lower steerer tube part 156 which extends from bearing flange 87 to the lower end of the steerer tube. Upper steerer tube part 155 and upper threaded portion 156 correspond to parts 45 and 46, respectively, of steerer assembly 24. The advantage of the embodiment of FIG. 13 is that only spool member 152 must be in place when the unitary crown and blade component is molded and, upon removal of the unitary component from the mold, spool-like member 152 will accommodate steerer tubes of different lengths. Spool-like member 152 also will accommodate steerer tubes of different diameters if internal threads 157 are formed at the largest diameter needed and then tubular inserts (not shown) threaded on the inside and outside are used to adapt this largest diameter to steerer tubes having smaller outside diameters at the lower steerer tube part 156.

With further reference to FIG. 13, the threaded length of lower steerer tube part 156 is shown as being longer than both the internal threaded length and height of spool-like member 152. It is thus contemplated that lower steerer tube part 156 may extend through an aperture (not shown) in lower wall 79 of crown boss 26 such that the lower end of steerer tube part 156 projects downwardly so as to be visible below crown boss 26. In this regard, if an aperture is not provided in lower crown boss wall 79, the length of lower steerer tube part 156 should be less than the height of spool-like member 152 to avoid damaging lower wall 79 of the crown boss. In this latter instance, it may be desirable to countersink threads 157 so that this threaded passage does not extend all of the way down through spool-like member 152, but instead this passage has a lower end wall at flange 154.

Another modification contemplated is that spool-like member 152 may be entirely eliminated in favor of having the threads of lower steerer tube part 156 pass entirely through crown boss 26 in a smooth cylindrical passageway (not shown) formed by an inner wall of prepreg material similar to inner wall 86 (FIGS. 4–5), but extending through an aperture in bottom crown wall 79. In this latter embodiment, threaded lower steerer tube part 156 would extend sufficiently below lower crown wall 79 to be engaged by a lower head tube bolt (not shown) similar to upper head tube bolt 130 (FIG. 9). Furthermore, because downwardly directed force vectors on a front fork assembly are of relatively small magnitude and may be resisted sufficiently by the clamping forces of the upper triple clamp 40 or 110, a threaded lower steerer tube part and lower head tube bolt may not be needed in some applications where a lower steerer tube portion extends into and/or through a smooth cylindrical passageway (not shown) in crown boss 26. In such a modification, the crown boss and its blade connecting structure could be reinforced by an anchor member separate from the steerer tube but having shapes similar to the anchor members shown in the drawings.

FIGS. 14–16 show a modification of the unitary crown and blade component wherein a single upper blade portion 180 extends upward from the center of a crown arch portion 182 which connects together two lower blade portions 184,184 which have the same shape and diverge in the same manner as lower blade portions 32,32 of the embodiment of FIGS. 1-11. The steerer assembly 186 of the modification of FIGS. 14 and 15 is the same as that shown in FIG. 6, and has a pair of depending legs 187,187 laminated to the inner walls of lower blade portions 184,184.

The single upper blade portion 180 is clamped to the threaded upper steerer tube end 189 by a dual clamping member 190 having a body 191 containing two apertures 192 and 193 (FIG. 16) for receiving a top blade cap 194 and the upper steerer tube end 189, respectively, as shown in FIG. 15. The clamping action for securing dual clamp member 190 to the upper ends of the steerer tube and the upper blade portion is provided by a clamping bolt 196 which traverses a slot 197 and engages threads 198 in body 191 of dual clamping member 190. An advantage of the modifications of FIGS. 14–16 is that the two-into-one blade design reduces the frontal area for creating wind resistance. Another advantage is that the single upper blade portion 180 causes less interference with the adjacent head tube of the bicycle frame, particularly during large rotations of the fork assembly away from its centered position.

Referring now to FIG. 17, there is shown a mold assembly 160 for molding the unitary crown and blade component 21 which is shown in lying in its molded condition in a lower mold half 162. An upper mold half 164 illustrates the contours of the molding surfaces against which the uncured composite material is pressed by the internal pressurization provided on the inside of the uncured shell for the unitary component by the bladders 88 and the expanding foam layer 74 (FIGS. 4 and 5). The bladders are connected to a source of air pressure by a pair of air lines 166,166 and a pair of bladder connectors 167,167. Connectors 167,167 are connected to and engage a pair of bladder extensions 168,168 in the manner described in greater detail in above-referenced U.S. Pat. No. 5,016,895.

Upper mold half 164 includes a projecting main boss portion 170 for engaging and holding in position steerer assembly 24 which rests within an appropriately sized and shaped groove 172 in lower mold half 162. Upper mold half 164 also includes a secondary boss portion 174 for forming the concave curvature in front crown wall 77 as seen best in FIG. 4. Lower mold half 162 also has an appropriate recess 176 for shaping crown boss 26. The techniques for laying up in mold 160 the strips and patches of prepreg material for forming an uncured shell of the blade and crown component, and for pressurizing and curing this shell, are preferably those described in the above-referenced U.S. Patent and in U.S. Pat. No. 4,889,355 issued to Brent Trimble on Dec. 26, 1989, the entire contents of said patent also being expressly incorporated herein by reference.

While a number of modifications have already been described above, one skilled in the art will recognize that other modifications are possible in the unitary crown and blade component and in the steerer assembly associated therewith, and that it is also possible to modify the materials and methods for making these components in ways other than those described above. While the best and other specific modes of the invention have been described in detail, and have been shown in the accompanying drawings, these are only specific examples of the invention and it will be evident to the skilled person that other modifications are possible which do not depart from the scope of the invention as defined in the claims hereinbelow.

What is claimed is:

1. A fork assembly for a cycle comprising:
a steerer assembly comprising a steerer tube for being rotatably received within a head tube of the cycle, a lower connector part at a lower end portion of the steerer tube and positioned to extend below said head tube when the steerer tube is received therein, and an upper connector part at an upper end portion of the steerer tube and positioned to extend above said head tube when the steerer tube is receive therein; and,
a generally hollow unitary crown and blade component having a substantially continuous wall of resin-impregnated fibrous material extending around at least a portion of an interior chamber of said crown and blade component, said crown and blade component comprising crown means, an upper elongated blade means extending upward from said crown means and integrally connected thereto by said substantially continuous wall, a lower elongated blade means extending downward from said crown means and integrally connected thereto by said substantially continuous wall, attachment means for attaching an upper end portion of said upper blade means to said upper connector part of the steerer assembly, and connection means for connecting said crown means to said lower connector part of the steerer assembly.

2. A fork assembly according to claim 1 wherein said substantially continuous wall has at least two opposing wall sections, each of which comprises at least one cured layer of said resin-impregnated fibrous material; and wherein said connection means comprises an anchor means having an anchor member connected to and extending radially beyond said steerer tube, at least part of said anchor member being laminated between said opposing wall sections to fixedly connect said crown and blade component to said steerer assembly.

3. A fork assembly according to claim 2 wherein one of said opposing wall sections is provided by a generally hollow crown portion of said crown and blade component and the other of said opposing wall sections is provided by a generally hollow blade portion of said crown and blade component.

4. A fork assembly according to claim 3 wherein said anchor member has at least one aperture through which said crown wall section is integrally united to said blade wall section by a molded juncture.

5. A fork assembly according to claim 2 wherein said anchor member comprises two depending legs extending radially outward beyond said steerer tube of said steerer assembly, and wherein said lower blade means comprises two generally hollow blade portions each integrally united to a generally hollow crown portion of said crown means by said substantially continuous wall, each of said blade portions comprising at least one molded layer of fibrous material impregnated with a synthetic resin.

6. A fork assembly according to claim 5 wherein each of the legs of said anchor member contains an aperture, wherein a wall section of one of said blade portions is moldedly bonded through the aperture of one of said legs to a wall section of said crown portion, and wherein a wall section of the other of said blade portions is moldedly bonded through the aperture of the other of said legs to another wall section of said crown portion.

7. A fork assembly according to claim 2 wherein said crown means is adhesively bonded both to the laminated part of said anchor member and to a second radially extending part of said anchor member carried by the steerer tube of said steerer assembly at an intermediate axial position spaced along said steerer tube at an axial distance from the laminated part of said anchor member.

8. A fork assembly according to claim 2 wherein said opposing wall sections are bonded together to enclose and engage at least a portion of said anchor member to mechanically lock said crown and blade component to said steerer assembly.

9. A fork assembly according to claim 2 wherein said steerer assembly and said anchor member are made of metal.

10. A fork assembly according to claim 2 wherein said anchor member has two leg portions each extending outward radially beyond said steerer tube, and wherein said opposing wall sections are bonded together to enclose and engage at least part of each of said leg portions.

11. A fork assembly according to claim 2 wherein said opposing wall sections are bonded together by a pressure molded juncture.

12. A fork assembly according to claim 1 wherein said lower connector part extends axially into a boss portion of said crown means, wherein said connection means comprises an anchor member connected to said lower connector part and having a flange extending radially beyond said lower connector part, and wherein said flange is secured to a segment of said substantially continuous wall.

13. A fork assembly according to claim 1 wherein said crown means comprises a crown portion molded around at least part of an anchor member connector to the lower connector part of said steerer assembly; wherein said lower blade means comprises a generally hollow lower right blade portion extending between said crown portion and a wheel support means for engaging the right side of a wheel assembly, and a generally hollow lower left blade portion extending between said crown portion and a wheel support means for engaging the left side of said wheel assembly; wherein said upper blade means comprises a generally hollow upper right blade portion extending between said crown portion and said attachment means, and a generally hollow upper left blade portion extending between said crown portion and said attachment means; and wherein each of said blade portions is integrally united to said crown portion by said substantially continuous wall to form said crown and blade component.

14. A fork assembly according to claim 1 wherein said substantially continuous wall comprises at least two adjacent wall sections each comprising at least one molded layer of fibrous material impregnated with a synthetic resin, said adjacent wall sections being integrally united by at least one pressure molded juncture to provide said substantially continuous wall, said at least one pressure molded juncture comprising overlapping layers of said resin impregnated fibrous material provided by overlapped parts of said adjacent wall sections.

15. A fork assembly according to claim 1 wherein said connection means comprises an anchor means having two opposing leg portions extending radially outward beyond said steerer tube, and wherein a first segment of said substantially continuous wall is adhesively secured to one of said opposing leg portions and a second segment of said substantially continuous wall is adhesively secured to the other of said opposing leg portions to fixedly connect said crown and blade component to said steerer assembly.

16. A fork assembly according to claim 1 wherein said substantially continuous wall comprises at least two adjacent wall sections each comprising at least one layer of fibrous material impregnated with a synthetic resin, said adjacent wall sections being integrally united by at least one pressure cured juncture to provide said substantially continuous wall, and said at least one pressure cure juncture comprising overlapping layers of said resin impregnated fibrous material provided by overlapped parts of said adjacent wall sections.

17. A fork assembly according to claim 1 wherein said connection means comprises an anchor member connected between said crown means and the lower connector part of said steerer assembly; wherein said upper blade means comprises at least one generally hollow upper blade portion extending between said crown means and said attachment means; and wherein said attachment means comprises an insert piece adhesively bonded to a distal end part of said upper blade portion, and a connecting member having a first part detachably secured to said insert piece and a second part detachably secured to the upper connector part of said steerer assembly.

18. A fork assembly according to claim 17 wherein said insert piece includes a head part extending beyond the distal end part of said upper blade portion, and wherein said connecting member comprises means for clampingly engaging said head part and the upper connector part of said steerer assembly.

19. A fork assembly according to claim 1 wherein said upper blade means comprises a generally hollow upper right blade portion extending between a crown portion of said crown means and said attachment means, and a generally hollow upper left blade portion extending between said crown portion and said attachment means, wherein said attachment means comprises a pair of insert pieces one adhesively secured to a distal end part of a corresponding one of said upper blade portions, each of said insert pieces having a head part extending beyond said distal end part of the corresponding upper blade portion; and wherein said attachment means further comprises a connecting member and means for clamping said connecting member to the head part of each of said insert pieces and to the upper connector part of said steerer assembly.

20. A fork assembly according to claim 12 wherein the boss portion of said crown means is molded around at least part of said anchor member, and the lower connector part of said steerer assembly is detachably connector to said anchor member.

* * * * *

UNITED STATES PATENT AND TRADEMARK OFFICE
CERTIFICATE OF CORRECTION

PATENT NO. : 5,078,417
DATED : January 7, 1992
INVENTOR(S) : John Mouritsen It is certified that error appears in the above-identified patent and that said Letters Patent is hereby corrected as shown below:

Column 14, line 36, change "connector" to --connected--.

Column 16, lines 26-27, change "connector" to --connected--.

Signed and Sealed this

Thirtieth Day of March, 1993

*Attest:*

STEPHEN G. KUNIN

*Attesting Officer*    Acting Commissioner of Patents and Trademarks